Figure 1:
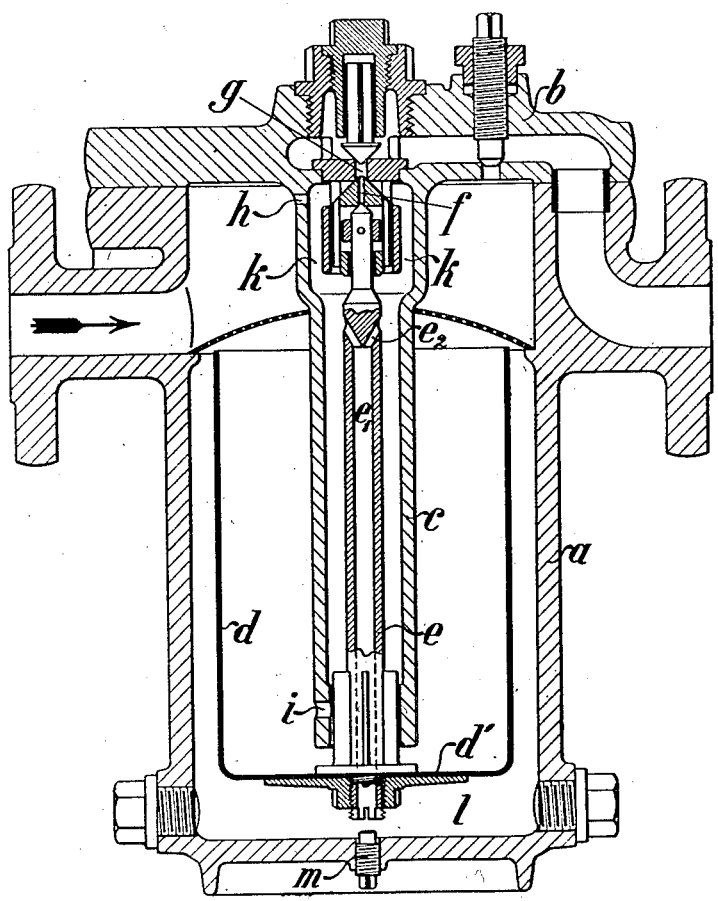

No. 882,400. PATENTED MAR. 17, 1908.
I. & E. MAYER.
STEAM TRAP.
APPLICATION FILED DEC. 31, 1906.

2 SHEETS—SHEET 1.

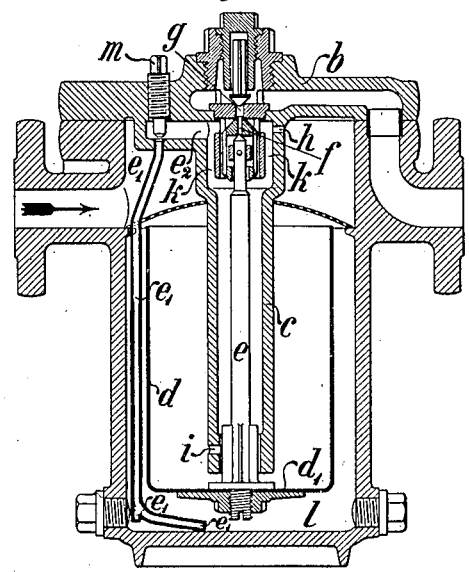
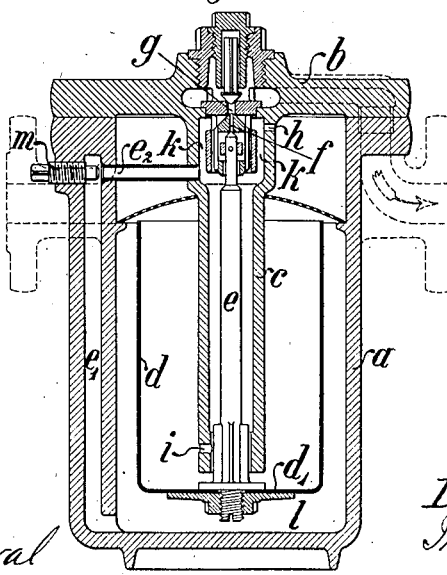

UNITED STATES PATENT OFFICE.

ISIDOR MAYER AND ERWIN MAYER, OF VIENNA, AUSTRIA-HUNGARY.

STEAM-TRAP.

No. 882,400.

Specification of Letters Patent.

Patented March 17, 1908.

Application filed December 31, 1906. Serial No. 350,295.

*To all whom it may concern:*

Be it known that we, ISIDOR MAYER and ERWIN MAYER, subjects of the Emperor of Austria-Hungary, residing at 64 Muthgasse, Vienna, Austria-Hungary, have invented certain new and useful Improvements in Steam-Traps; and we do hereby declare the following to be a full, clear, and exact description of the invention, such as will enable others skilled in the art to which it appertains to make and use the same.

Hitherto steam traps with open floats could not be fully utilized precisely at those times when the regular full working pressure prevailed. The weight of their floats was such that at the highest pressure for which they were intended, the float was raised and the discharge pipe closed before the whole contents of the float were emptied. Otherwise the floats of such steam traps would not have maintained the water seal when the lowest working pressure occurred, that is to say the float would have emptied itself allowing the steam to escape. A re-closing of the trap is effected solely by the suctional action of the escaping steam combined with the uniform buoyancy.

The above mentioned difficulty is due to the fact that during the working of the trap, that is to say on the sinking of the filled float and the ejection of the water through the open float valve a suctional action arises on a part of the inside bottom surface of the float and comes into effect at the lower end of the pipe which extends into the float and guides the float rod.

As the full working pressure is maintained on the outer bottom surface of the float, the difference of pressure acting on the large bottom surface of the float and produced by the suctional action corresponds to a suitable ideal diminution of the weight of the float together with the contents thereof.

The buoyancy of the float mentioned at the outset, and which is always uniform, and has a closing effect, is promoted in consequence of the described difference of pressure between the inner and the outer bottom surface of the float, so that the cut off is effected prematurely. With regard to the water hereby unnecessarily retained in the float the capacity of the trap is of course diminished every time the trap is opened. Hereby however the trap is forced to act much more frequently than would be actually necessary and accordingly is subjected to a rapid closing, quite apart from the fact that in many cases it is necessary to use a large trap. The same phenomenon appears at every medium pressure, even if to a reduced extent.

At the lowest pressure at which the trap still comes into effect, the emptying of the float can be effected up to close above the lower end of the pipe surrounding the float, so that the water seal that prevents the escape of steam is maintained. At this pressure, however, the float will never entirely fill because the partially filled float is already heavy enough to overcome the buoyancy and the over pressure on the float valve and has a closing action. The capacity of the body at the lowest pressure is therefore limited in itself.

This invention relates to a device applied to steam traps, by means of which the disadvantages mentioned above are entirely avoided.

This device consists substantially in the arrangement of a connecting pipe or conduit between the space below the float on the one hand and the space surrounding the shutting off valve on the other hand. In this space, which, when the cut off valve is opened, comes into communication with the outlet side, there rises during the out-flow of the water of condensation a fall of pressure, which is immediately transmitted through the connection pipe mentioned. Hereby a portion of the water of condensation surrounding the float is caused to flow away and a corresponding diminution of the buoyancy brought about. This flowing away of the surrounding water is effected the more profusely accordingly as the working pressure prevailing at the time is greater, and vice versa. Moreover the sucking away of the water below the bottom of the float and the slight reduction of pressure produced there cause the float to be easily sucked down.

By means of the decrease of the buoyancy of the float above mentioned and obtained by the diminution of the external water, the float is able to empty itself at all occurring working pressures up to the necessary remaining water closure in and through the connecting pipe, moreover a portion of the external water is carried off, so that at each play the greatest possible capacity is attained. Finally the auxiliary pipe that runs from the lowest point in the interior of the casing effects at the same time the freeing of the steam trap from mud.

In Figures 1 to 3 of the accompanying drawings three different forms of the device described are illustrated as applied to a steam trap in other respects similar. In the form shown in Fig. 1 the novel auxiliary pipe is formed by the central hollow float rod; in Fig. 2 by a pipe arranged inside the discharge casing and in Fig. 3 it is run into the side of the casing itself. The casing $a$ is closed with a cover $b$ which carries the inwardly extending pipe $c$. In the casing is a buoyant float preferably in the form of a buoyant bucket $d$ open at the top, the float rod $e$ of which fixed in the middle of the float bottom $d'$, and guided below in the pipe $c$ carries at its upper end a valve device $f$ of any preferred and known kind, by means of which, when the float is raised, the passage $g$ in the cover $b$ of the casing is closed. The float rod $e$ is furnished with a boring $e'$ forming the connecting pipe, which is connected above through one or more openings $e^2$ with the hollow space $k$ formed by the pipe $c$ and below with the space underneath the float $d$. The openings $e^2$ are situated above the upper edge of the float $d$ in order to prevent communication between the water in the float and the water around it. In the pipe $c$ near the cover $b$ a boring $h$ is formed and in the lower part above the limit of the necessary water cut off one or more borings $i$. By means of the aperture $h$ which is made very small in order to prevent filling of the space $k$ with steam and consequent failure of the water in the bucket to rise, the air is removed from the trap.

The action of the device consisting in the boring $e'$ with connections $e^2$ is as follows: When the float filled by the inflowing water, overcoming the buoyancy and the excessive pressure on the valve surface $f$, sinks, and the water is consequently forced through the pipe $c$ and the valve opening $g$ out of the float $d$, the disturbing suctional action described in the beginning takes place on the upper surface of the float bottom $d'$. At the moment when the float sinks and the valve device $f$ is opened, a lower pressure prevails in the space $k$ surrounding the valve $f$ caused by the flowing away of the water, which is at once drawn up through the conduits $e^2$, $e'$. Hereby a portion of the water surrounding the float is caused to flow away and the buoyancy of the float is correspondingly diminished through the fall of the external water. The borings $e^2$ are so arranged that they open in the direction of the water flowing out through the valve arrangement, whereby the escape of the water around the valve $f$ is promoted according to the suctional action caused by the water flowing past. The exact regulation of the diminution in the quantity of water surrounding the float is rendered possible by varying the cross section for the borings $e'$ and $e^2$ and the direction of $e^2$. The diminution of the buoyancy is effected in proportion as the water level has to fall in the float, in order, as distinguished from the mode of action hitherto to insure always an emptying up to the water seal. The float only acquires the tendency to rise and to close the valve when nearly empty and sufficient water only being left to form the water seal above the lower opening of the pipe $c$. The consequence of this is that even at the highest working pressure for which it is intended, that is at normal working, the trap is emptied approximately to the full contents of the float. To this should be added moreover the water thrown out through the connecting conduit $e'$ and $e^2$, which forms a portion of the quantity of water surrounding the float. In order that a portion of the water in the hollow space of the pipe $c$ may be removed, one or more borings $i$ may be formed in the lower part of this pipe above the limit of the water seal. At the moment when the water in the float has sunk below the borings $i$ and the raising of the float and the closing of the valve therewith connected are effected, the steam flowing through the boring $i$ will cause the water in the hollow space of the pipe $c$ to be forced out, while the float rises and closes the valve $f$, before steam escapes through the valve. By this arrangement the water contained in the float and a portion of the water surrounding the float will be emptied each time the valve $f$ is opened and the highest possible capacity will be reached. After the float has been raised again, the space around the float is first filled and then the float itself when the cycle of operations will be repeated. At every medium pressure the same phenomenon appears, that is to say the float is emptied as far as the water cut off, but the float cannot fill entirely, so that the capacity is somewhat reduced. At the lowest pressure at which the trap can be used according to its valve boring, the float is likewise emptied to the water cut off, while correspondingly to the smaller closing power of the excessive pressure on the valve the float will again sink and empty before being entirely filled. At the lowest pressure therefore the trap has the highest attainable capacity. The partial emptying of the space surrounding the float has, as mentioned at the outset, the further advantage that the fine mud contained in the water, which in other traps collect in the space around the float and in time interferes with the effective action, is stirred up at every discharge and carried off by the water, whereby its unimpeded action is made independent of the regular removal of the mud.

It will be seen that the action of the new device is entirely independent of the course of the connecting conduit $e'$ $e^2$. This conduit may for example be arranged outside the float $d$ as shown in Fig. 2, it may also be run into the casing as shown in Fig. 3 or finally it may be placed outside the casing entirely. All that is essential is that it should connect the two spaces $l$ and $k$ in the manner described.

In the case of the connecting conduit being arranged laterally the whole of the remainder of the trap may be in the same form as hitherto, also the same applies if the connecting conduit $e$, as shown in Fig. 2 is formed by a pipe and the opening into the space $k$ by a suitable boring $e^2$ inclined downwards.

In order to insure a faultless action of the novel connecting conduit it is important that the suctional action of the same should be so regulated, or adjusted, that a sinking of the level of the external water is effected correspondingly to the working pressure at any time, in order that under all working conditions the discharge of the water collected in the float may be effected at every discharge up to the necessary remaining water seal. This regulating of the action of the connecting conduit can be suitably effected by a suitable throttling of the same. The throttling is most easily effected in the known manner by means of a screw $m$ the free end of which is introduced to a certain extent into the conduit $e'$. It will be at once seen that the suctional action of the conduit $e'$ $e^2$ and thereby the sinking of the external water level, and finally the suctional action brought about below the float bottom will be increased or decreased according to the position of the screw $m$.

If it is desired not to make use of the suctional action below the float bottom or the mud removing action of the conduit $e'$ $e^2$ the conduit must be arranged so far downwards from the space $k$ into the space around the float that it extends to or below the lowest fall of the level of the external water. By raising or lowering the opening of this pipe the quantity of the water flowing away and thereby the capacity of the device can be regulated.

What we claim and desire to secure by Letters Patent is:—

1. In a steam trap having a buoyant bucket with a water space surrounding it, the combination of a discharge valve arranged above the top of said bucket, a casing surrounding said valve and projecting into and communicating with the interior of said bucket, and a conduit connecting the space surrounding the discharge valve with the water space surrounding the bucket.

2. In a steam trap having a buoyant bucket with a water space surrounding it, the combination of a discharge valve, a pipe surrounding said valve and depending into said bucket and communicating therewith, and a conduit connecting the space surrounding the discharge valve and the water space surrounding the bucket and projecting into the space below the bucket bottom.

3. In a steam trap having a buoyant bucket with a water space surrounding it, the combination of a discharge valve having a space surrounding it and a pipe connecting the space around said valve with the space below said bucket, said pipe being provided with apertures opening into the space around said valve.

4. In a steam trap having a bucket with a water space surrounding it, the combination of a discharge valve, a conduit having apertures opening into the space around said discharge valve and connecting said space with a space below the bottom of the bucket, and means through which the steam passes when the water level is lowered in said bucket to force the water of condensation in the bucket through the discharge valve before the latter is closed.

Intestimony whereof we have affixed our signatures, in presence of two witnesses.

ISIDOR MAYER.
ERWIN MAYER.

Witnesses:
   ALVESTO S. HOGUE,
   AUGUST FUGGER.